United States Patent
Kim et al.

(10) Patent No.: US 8,160,650 B2
(45) Date of Patent: Apr. 17, 2012

(54) BIDIRECTIONAL SLIDE-TYPE MOBILE COMMUNICATION TERMINAL AND METHOD OF PROVIDING GRAPHIC USER INTERFACE THEREOF

(75) Inventors: Nam-Kyu Kim, Yongin-si (KR);
Nam-Mi Kim, Seoul (KR);
Chang-Hwan Hwang, Goyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 913 days.

(21) Appl. No.: 12/050,530

(22) Filed: Mar. 18, 2008

(65) Prior Publication Data

US 2008/0287169 A1     Nov. 20, 2008

(30) Foreign Application Priority Data

May 17, 2007   (KR) ................. 10-2007-0048271

(51) Int. Cl.
*H04B 1/38*   (2006.01)
*H04B 1/08*   (2006.01)
*H04M 1/00*   (2006.01)
*H04M 3/00*   (2006.01)
*H04M 9/00*   (2006.01)
*G09G 5/00*   (2006.01)

(52) U.S. Cl. ............... 455/566; 455/575.4; 455/348; 379/364; 379/433.12; 345/619; 345/633; 345/636

(58) Field of Classification Search ............... 455/414.1, 455/550.1, 566, 575.1, 575.4, 128, 347, 348, 455/364; 379/433.12, 428.03, 433.04; 345/619, 345/629, 633, 636, 649
See application file for complete search history.

(56) References Cited

U.S. PATENT DOCUMENTS

| | | | |
|---|---|---|---|
| 6,278,888 B1 | 8/2001 | Hayes, Jr. et al. | |
| 2003/0076306 A1 | 4/2003 | Zadesky | |
| 2006/0063569 A1* | 3/2006 | Jacobs et al. | 455/575.1 |
| 2007/0287512 A1* | 12/2007 | Kilpi et al. | 455/575.1 |
| 2008/0098330 A1 | 4/2008 | Tsuk et al. | |
| 2008/0268901 A1* | 10/2008 | Miramontes | 455/556.1 |

FOREIGN PATENT DOCUMENTS

| | | |
|---|---|---|
| JP | 2003523096 | 7/2003 |
| JP | 2005507112 | 3/2005 |
| JP | 2005130219 | 5/2005 |
| JP | 2005175777 | 6/2005 |
| KR | 1020050021818 | 3/2005 |
| KR | 1020060091682 | 8/2006 |
| KR | 1020070039116 | 4/2007 |
| WO | 2006085129 | 8/2006 |

OTHER PUBLICATIONS

European Search Report dated Oct. 14, 2008.
Japanese Office Action dated Mar. 1, 2011 on JP Application No. 2008-130167, which corresponds to U.S. Appl. No. 12/050,530.

* cited by examiner

*Primary Examiner* — Andrew Wendell
(74) *Attorney, Agent, or Firm* — H.C. Park & Associates, PLC (57) ABSTRACT

A bidirectional slide-type mobile communication terminal for providing a user interface that changes in real time according to input includes a sensor-equipped lower body and an upper body that slides with respect to the lower body. A method of providing such a graphic user interface includes sensing a sliding movement of the upper body, switching the terminal to an operation mode corresponding to the direction of the sliding movement, displaying the graphic user interface corresponding to the operation mode to which the terminal is switched, receiving input from a sensor, and changing the displayed graphic user interface in real time corresponding to the received input.

20 Claims, 10 Drawing Sheets

BIDIRECTIONAL SLIDE-TYPE MOBILE COMMUNICATION TERMINAL AND METHOD OF PROVIDING GRAPHIC USER INTERFACE THEREOF

CROSS REFERENCE TO RELATED APPLICATION

This application claims priority from and the benefit of Korean Patent Application No. 10-2007-0048271, filed on May 17, 2007, which is hereby incorporated by reference for all purposes as if fully set forth herein.

BACKGROUND OF THE INVENTION

1. Field of the Invention

The present invention relates to a bidirectional slide-type mobile communication terminal and a method of providing a graphic user interface thereof, and more particularly to a bidirectional slide-type mobile communication terminal for providing a user interface that changes in real time according to user input, which may enable a user to recognize and easily operate the user interface, and a method of graphically providing such a user interface.

2. Discussion of the Background

Mobile communication terminals not only tend to be compact, slim, and lightweight, but are also moving toward providing a wider variety of functions and designs in order to meet various user demands.

In particular, the demand for mobile communication terminals that have multimedia functions has increased explosively around the rising generation who tend to be very interested in image media, such as pictures, movies, or music videos. As a result, mobile communication terminal manufacturers are now supplying large quantities of mobile communication terminals having built-in digital cameras or being capable of video playback.

A mobile communication terminal may be classified as a bar-type mobile communication terminal, a flip-type mobile communication terminal, a folder-type mobile communication terminal, or a slide-type mobile communication terminal. The slide-type mobile communication terminal includes a terminal body that is divided into two parts, that is, an upper body and a lower body, and that is opened/closed by sliding the upper body relative to the lower body. In recent years, a bidirectional slide-type mobile communication terminal has also been developed, in which the upper body can slide downward as well as upward.

Such a bidirectional mobile communication terminal has been devised to enable a user to conveniently use a camera function aside from the basic communication function, and has a structure that allows the camera direction to be changed by sliding the upper body downward. However, since the bidirectional slide-type mobile communication terminal of the prior art is centered around use of the camera, its other functions may be relatively weak.

For example, when a user slides the cover of the terminal body down in order to listen to music, he/she may only be able to use direct keys, including PLAY, FF, and REW keys to listen to music. Moreover, while an interface that is only for the camera may be provided in the terminal, there is no such interface for music listening, which may inconvenience the user. In addition to music listening, other functions equipped in the terminal, such as an environment setting function, a message creation function, a phonebook function, and so forth, may have relatively weak interfaces, and thus the user may be inconvenienced in using these functions.

SUMMARY OF THE INVENTION

The present invention provides a bidirectional slide-type mobile communication terminal for providing a graphic user interface that changes in real time according to user input, which may enable a user to easily recognize and operate the user interface, and a method of graphically providing such a user interface.

Additional features of the invention will be set forth in the description which follows, and in part will be apparent from the description, or may be learned by practice of the invention.

The present invention discloses a method of providing a graphic user interface in a bidirectional slide-type mobile communication terminal including a touch band equipped lower body and an upper body that slides with respect to the lower body. The method includes sensing a sliding movement of the upper body, switching the terminal to an operation mode corresponding to a direction of the sensed sliding movement, displaying a graphic user interface (GUI) corresponding to the operation mode to which the terminal is switched, receiving input from the touch band, and changing the displayed graphic user interface in real time corresponding to the received input.

The present invention also discloses a bidirectional slide-type mobile communication terminal including a lower body and an upper body that slides with respect to the lower body, a touch band to receive an input, the touch band being located in the lower body and having an arcuate shape, a display to display a graphic user interface (GUI) including a guide band that substantially forms a circle with the touch band when the upper body slides, and a controller to control the display to graphically change the guide band in real time corresponding to the input received by the touch band.

The present invention also discloses a bidirectional slide-type communication terminal including a lower body and an upper body that slides with respect to the lower body, a sensor located on the lower body to receive an input, a display to display a graphic user interface and including a guide band, and a controller to control the display to graphically change the guide band in real time corresponding to the input received by the sensor. The sensor and the guide band have the same shape.

It is to be understood that both the foregoing and general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Figure 1A:
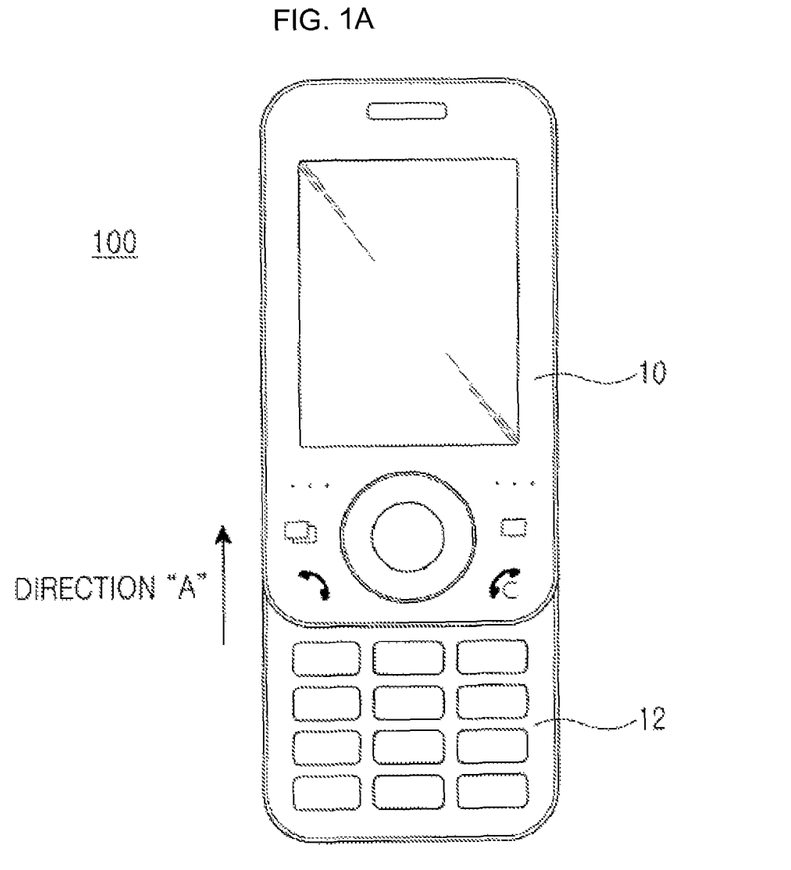
FIG. 1A and FIG. 1B are views showing a bidirectional slide-type mobile communication terminal according to an exemplary embodiment of the present invention.
Figure 1B:
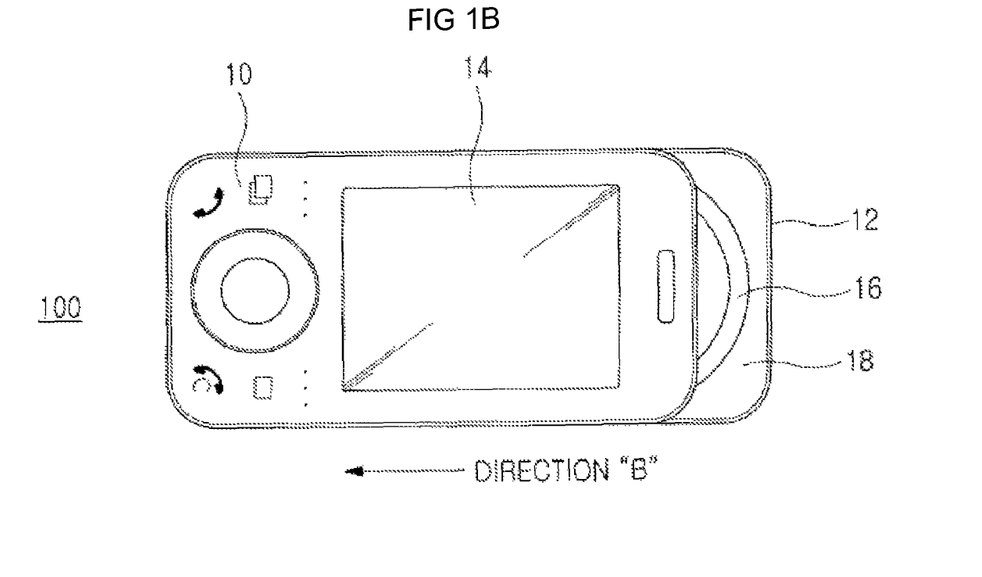

FIG. 1A and FIG. 1B show a bidirectional slide-type mobile communication terminal according to an exemplary embodiment of the present invention. FIG. 1A shows the mobile communication terminal in a communication mode, and FIG. 1B shows the mobile communication terminal in a multimedia playback mode.

In this exemplary embodiment, a communication mode is implemented when an upper body 10 of the mobile communication terminal 100 slides in direction "A", as shown in FIG. 1A, and a multimedia playback mode is implemented when the upper body 10 slides in direction "B", as shown in FIG. 1B.

A lower body 12 of the mobile communication terminal 100 is provided with a touch band 16 including a sensor that can sense user input to perform the multimedia playback mode. The touch band 16 provided in the lower body 12 may be, for example, an arcuate band, and receives user input. The mobile communication terminal changes a graphic user interface (GUI) in real time according to user input and displays the changed GUI on a display 14. Here, the GUI refers to a user interface that is implemented in a graphic form among various interfaces to be displayed on the display 14 that correspond to respective operation modes. The GUI that changes in real time corresponding to a user input received through the touch band 16 is referred to as a guide band 42 (shown in FIG. 4).

Also, the lower body 12 is provided with a speaker 18 to output voice data. As shown in FIG. 1B, the speaker 18 may surround the touch band 16. The speaker 18 further outputs sound effects corresponding to the guide band 42, which changes in real time according to the operation mode of the mobile communication terminal 100.

Figure 2:
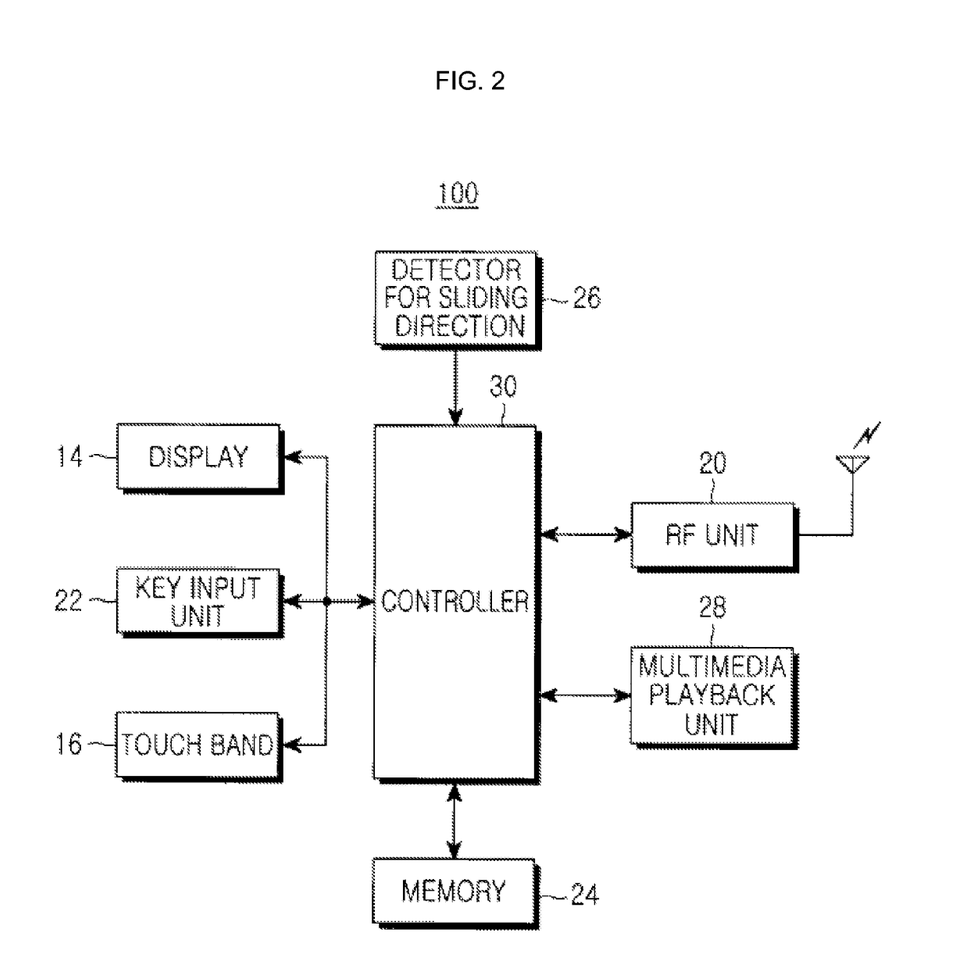
FIG. 2 is a block diagram schematically showing a structure of a bidirectional slide-type mobile communication terminal according to an exemplary embodiment of the present invention.

FIG. 2 schematically shows the structure of a bidirectional slide-type mobile communication terminal according to an exemplary embodiment of the present invention.

The mobile communication terminal 100 according to this exemplary embodiment includes an radio frequency (RF) unit 20, a key input unit 22, a memory 24, a detector 26 to detect the direction of a sliding movement, a multimedia playback unit 28, the display 14, a controller 30, and the touch band 16.

The RF unit 20 is responsible for radio communication functions of the mobile communication terminal 100. The RF unit 20 includes an RF transmitter (not shown) to up-convert and amplify the frequency of a signal to be transmitted, an RF receiver (not shown) to low-noise amplify and down-convert the frequency of a received signal, etc.

The key input unit 22 includes keys, such as numeric keys, character keys, and function keys, and receives input from a user via the keys.

The memory 24 may include a program memory and a data memory and stores various information and multimedia data necessary to control the operation of the mobile communication terminal δ 00.

The detector 26 detects the direction in which the upper body 10 of the mobile communication terminal 100 slides.

The multimedia playback unit 28 plays back multimedia data already stored in the memory 24 or multimedia data received through an antenna, etc.

The display 14 may be a liquid crystal display (LCD) or the like and outputs various display data generated in the mobile communication terminal 100. If the display 14 is a touch screen display, it may also operate as an input unit.

The controller 30 controls the display 14, according to this exemplary embodiment, to display an interface including the guide band 42 according to the operation mode of the mobile communication terminal 100. The display 14 can display the guide band 42 in real time as it changes corresponding to user input received through the touch band 16, as will be described below.

The controller 30 controls the overall operation of the mobile communication terminal 100. The controller 30 according to this exemplary embodiment controls the mobile communication terminal 100 to perform an operation mode corresponding to the direction "B" when the upper body 10 slides in the direction "B". Also, the controller 30 receives user input from the touch band 16 provided in the lower body 12, and controls the mobile communication terminal 100 to change the guide band 42 in real time corresponding to the user input and display the changed guide band 42 on the display 14.

The touch band 16 is located in the lower body 12 of the mobile communication terminal 100 and receives a user's touch input corresponding to the operation mode of the mobile communication terminal 100. To this end, the touch band 16 is provided with a sensor capable of sensing the user input.

A touch input may be entered, for example, by continuously touching the touch band 16 while moving from any one point on the touch band 16 to any other point thereof, or by pressing any one point on the touch band 16 for a given time. The touch band 16 may have an arcuate shape, as shown in FIG. 1.

The touch band 16 is not altered by the touch input because it is fixed to the lower body 12, but the guide band 42 on the display 14 changes in real time corresponding to the touch input, and thus the guide band 42 may rotate like a rolling wheel.

Figure 3:
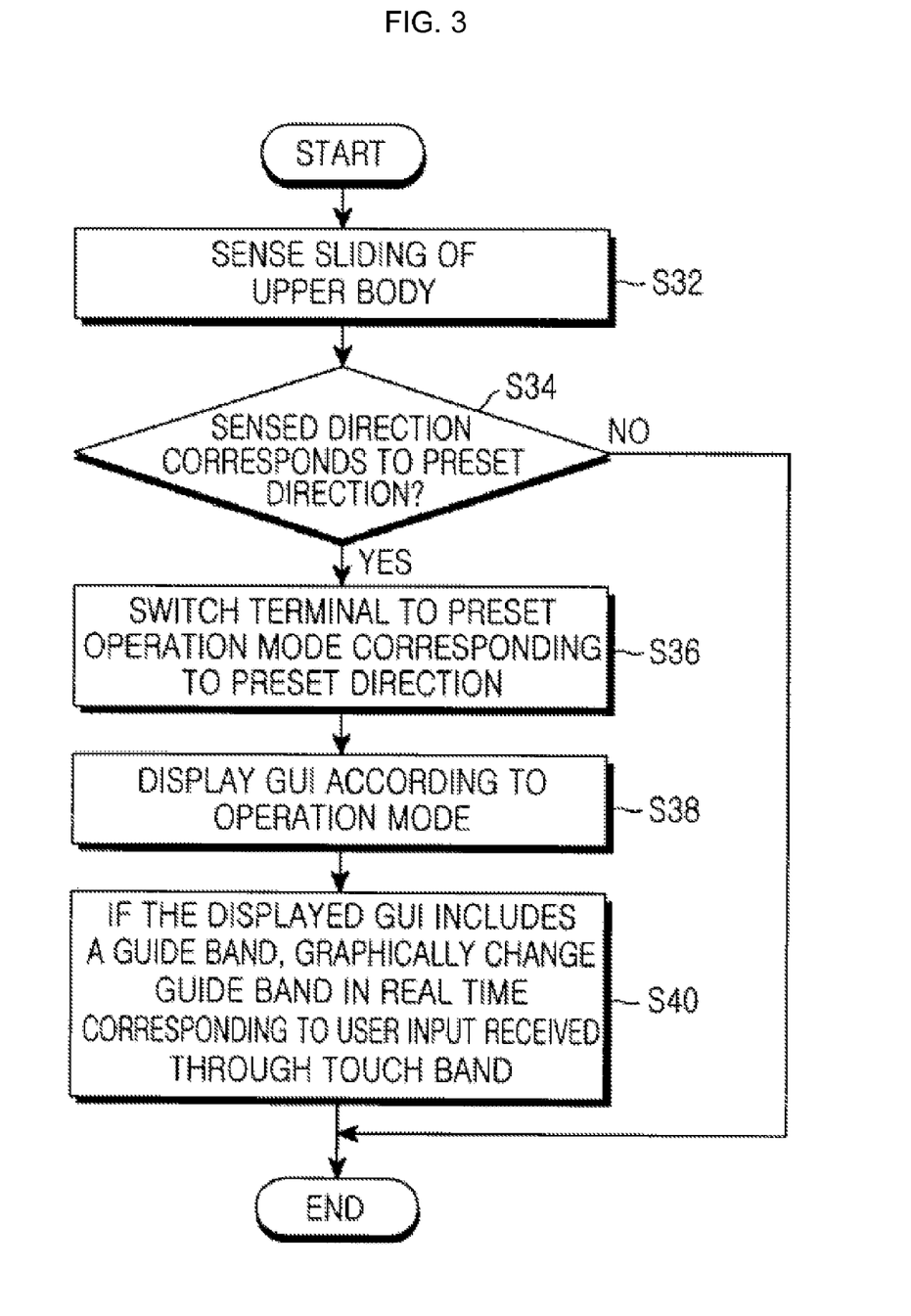
FIG. 3 is a flowchart showing a method of graphically providing a user interface in a bidirectional slide-type mobile communication terminal according to an exemplary embodiment of the present invention.

FIG. 3 shows a method of providing a graphic user interface in a bidirectional slide-type mobile communication terminal according to an exemplary embodiment of the present invention.

When the upper body 10 of the mobile communication terminal 100 slides, the sensor 26 senses in which direction the upper body 10 slides and sends information of the sliding direction to the controller 30. Depending on the direction sensed by the sensor 26, the controller 30 determines if the direction of the sliding movement of the upper body 10 corresponds to a preset direction (S34).

If the controller 30 determines that the upper body 10 slides in the preset direction (S34: YES), the controller 30 switches the mobile communication terminal 100 to a predetermined operation mode corresponding to the preset direction (S36).

The predetermined operation mode may be, for example, a communication mode, a multimedia playback mode, or a message (SMS) creation mode. If the predetermined operation mode in step S36 is the multimedia playback mode, the mobile communication terminal 100 switches to the multimedia playback mode. Further, the controller 30 can receive user input, thereby controlling the playback unit 29 to reproduce multimedia data.

If the mobile communication terminal 100 switches to the predetermined operation mode, the display 14 displays a GUI according to the operation mode (S38). If the displayed GUI includes a guide band 42, the mobile communication terminal 100 changes the guide band 42 in real time corresponding to user input received through the touch band 16, and displays the changing guide band 42 on the display 14 (S40). How the guide band 42 is displayed in real time corresponding to the user input received through the touch band 16 will be described below in detail.

If the controller 30 determines that the upper body 10 slides in a direction other than the preset direction (S34: NO), the mobile communication terminal 100 does not perform any other operation.

Figure 4:
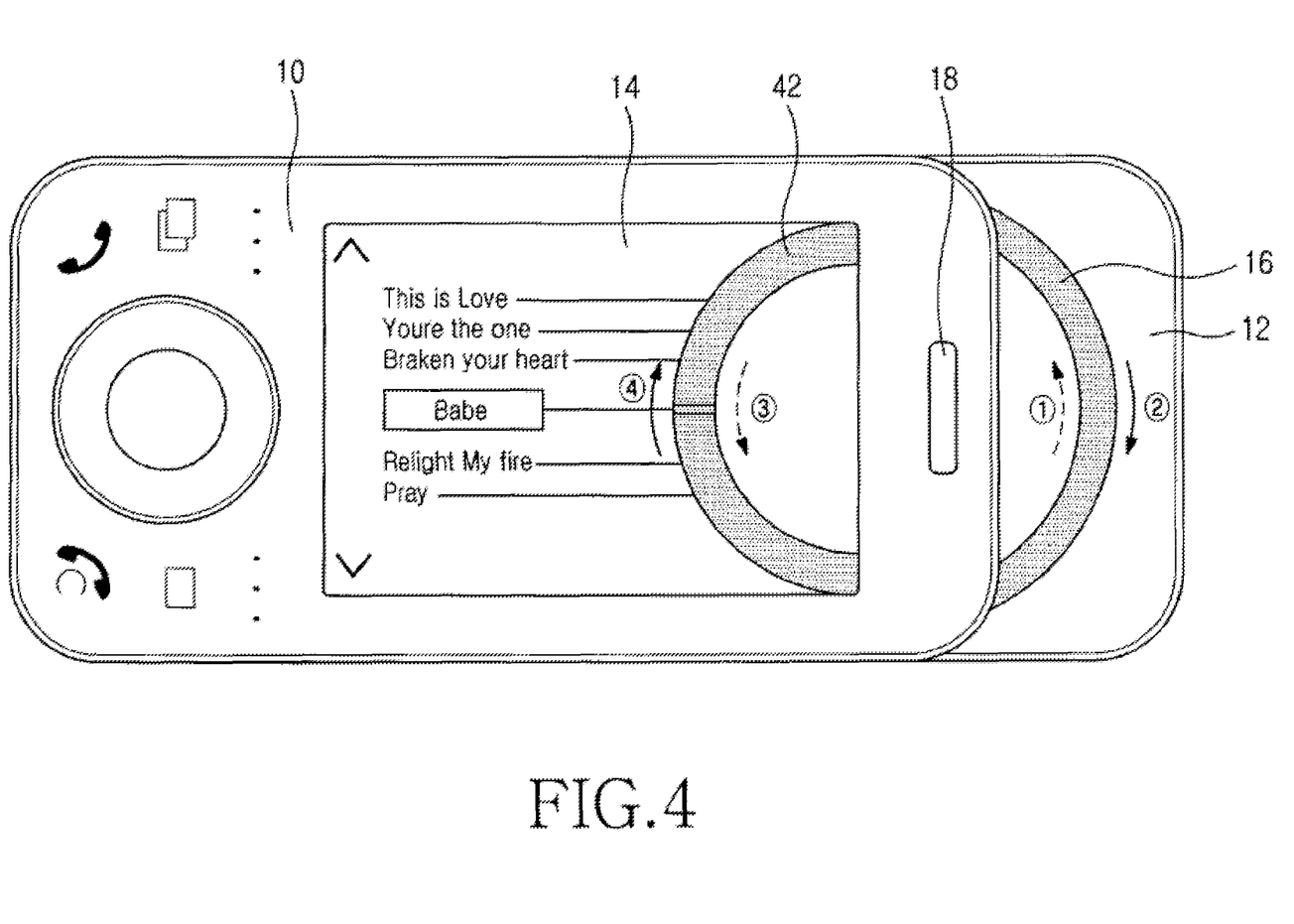
FIG. 4 is a view showing a user interface that changes in real time corresponding to a user input received through a touch band according to an exemplary embodiment of the present invention.

FIG. 4 shows a guide band that changes in real time corresponding to a user input received through a touch band according to an exemplary embodiment of the present invention.

An arch-shaped guide band 42 on the right side of the display 14 of the mobile communication terminal 100 and the arcuate touch band 16 provided in the lower body 12 are connected with each other, thereby forming a circle. The touch band 16 is equipped with the sensor, and thus receives user input.

User input supplied via the touch band 16 may be entered by continuously touching the touch band 16 from any one point of the touch band 16 to any other point of the touch band 16 or by pressing any one point on the touch band 16. In particular, the touch band 16 may be continuously touched in a clockwise direction (designated by arrow 2) or in a counterclockwise direction (designated by arrow 1) according to a moving direction of the continuous input. Although the touch band 16 does not actually move, the guide band 42 appears as if it is moving because the guide band 42 on the display 14 changes in real time corresponding to the user input on the touch band 16.

In the multimedia playback mode, the guide band 42 changing in real time corresponding to a user input is displayed as follows.

The mobile communication terminal 100 displays a title list of multimedia audio files on the display 14.

If a user enters input by continuously touching the touch band 16 from any one point to any other point in the clockwise direction (2) or counterclockwise direction (1), the guide band 42 displayed on the display 14 correspondingly rotates in the clockwise direction (designated by arrow 4) or counterclockwise direction (designated by arrow 3).

Further, as the guide band 42 on the display 14 rotates, the title list displayed on the left side of the guide band 42 scrolls up and down, so that another audio file can be selected. In the title list displayed on the display 14, the title of a selected audio file is enclosed by a box frame, as shown in FIG. 4. In this exemplary embodiment, it is assumed that a selected audio file is an audio file, the title of which is located within the center box frame of the display 14 from among titles of the title list.

For example, an audio file titled "Babe" has been selected in FIG. 4. When the guide band 42 rotates counterclockwise (3) according to a user input, the title list also rotates counterclockwise (3), and titles of the title list are rearranged. Thus, audio file selection shifts from the audio file titled "Babe" to an audio file titled "Broken your heart" or "You're the one". To the contrary, when the guide band 42 rotates clockwise (4), the title list scrolls from bottom to top, and titles of the title list are rearranged. Thus, audio file selection shifts from the audio file titled "Babe" to an audio file titled "Relight my fire" or "Pray".

Although this exemplary embodiment exemplifies a case where the title list of multimedia audio files rotates clockwise (4) or counterclockwise (3) according the rotation of the guide band 42, and titles of the title list are rearranged correspondingly, it may be possible to rotate only the box frame without rotating the title list. That is, when the guide band 42 rotates clockwise (4), the box frame moves correspondingly, and the same time audio file selection shifts from the audio file titled "Babe" to the audio file titled "Relight my fire" or "Pray".

Figure 5:
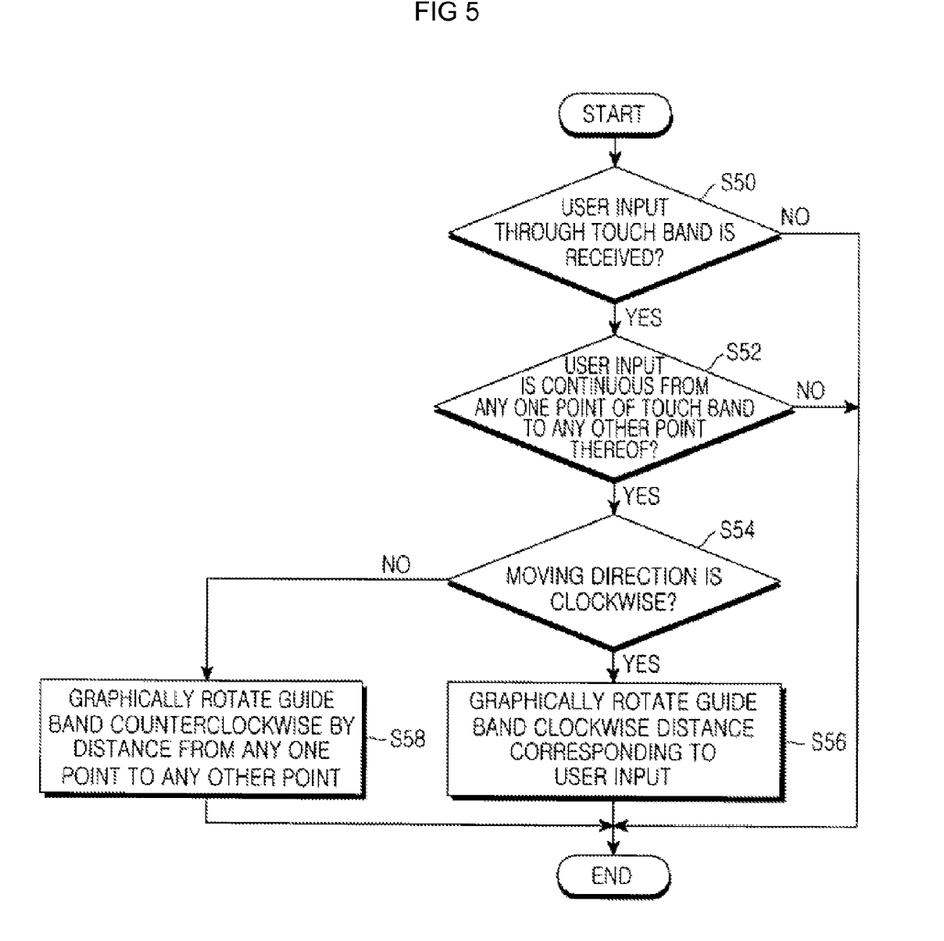
FIG. 5 is a flowchart showing a method of graphically providing a user interface that changes in real time corresponding to a user input received through a touch band according to an exemplary embodiment of the present invention.

FIG. 5 shows a method of providing a graphic user interface that changes in real time corresponding to a user input received through a touch band according to an exemplary embodiment of the present invention.

The controller 30 of the mobile communication terminal 100 determines if user input via the touch band 16 is received (S50). If a user input is not received (S50: NO), the mobile communication terminal 100 does not perform any other operation.

If a user input is received (S50: YES), the controller 30 determines if the user input is a user input that is continuous from any one point to any other point of the touch band 16 (S52). When the user input is not a continuous user input (S52: NO), the mobile communication terminal 100 does not perform any other operation.

When continuous input is entered (S52: YES), the controller 30 determines if the moving direction of the user input from any one point to any other point of the touch band 16 is clockwise (S54). If the moving direction is clockwise (S54: YES), the controller 30 controls the mobile communication terminal 100 to display the guide band 42 on the display 14 while rotating it the distance from the one point to the other point in a clockwise direction (S56).

If the guide band 42 is rotated in a counterclockwise direction (S54: NO), the controller 30 controls the mobile communication terminal 100 to display the guide band 42 on the display 14 while rotating it a distance corresponding to the user input in a counterclockwise direction (S58).

Figure 6:
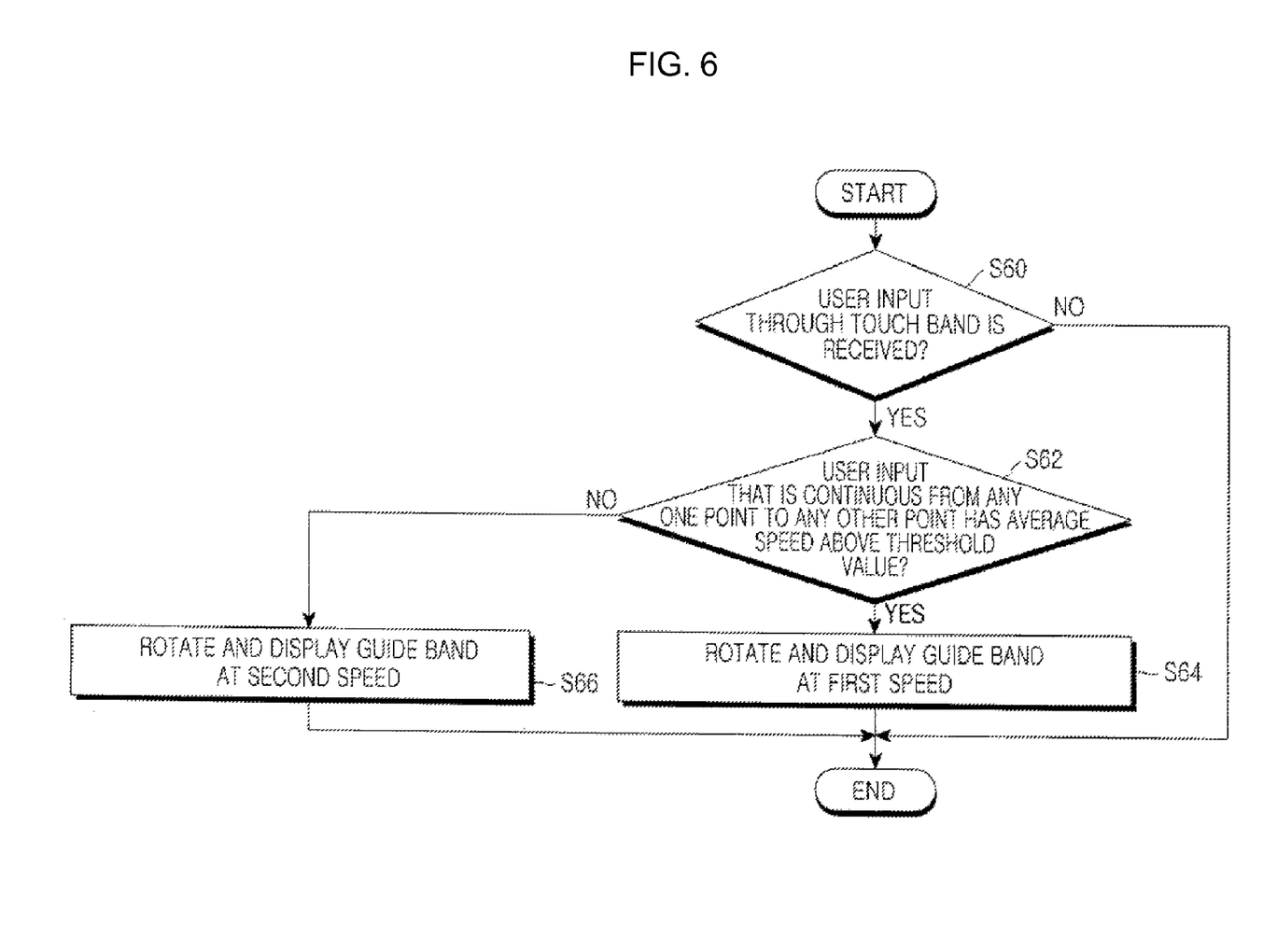
FIG. 6 is a flowchart showing a method of graphically providing a user interface that changes in real time corresponding to a user input received through a touch band according to another exemplary embodiment of the present invention.

FIG. 6 shows a method of providing a graphic user interface that changes in real time corresponding to a user input received through a touch band according to another exemplary embodiment of the present invention. In this exemplary embodiment, it is assumed that user input is entered by continuously touching the touch band 16 from any one point of the touch band to any other point thereof.

The controller 30 of the mobile communication terminal 100 determines if user input via the touch band 16 is received (S60). If user input is not received (S60: NO), the mobile communication terminal 100 does not perform any other operation.

If user input is received (S60: YES), the controller 30 determines if the average speed of the user input is equal to or greater than a threshold value (S62).

When the average speed of the user input is equal to or greater than the threshold value (S62: YES), the controller 30 controls the mobile communication terminal 100 to display the guide band 42 on the display 14 while rotating it at a first speed. To the contrary, when the average speed is below the threshold value (S62: NO), the controller 30 controls the mobile communication terminal 100 to display the guide band 42 on the display 14 while rotating it at a second speed. Here, the threshold value may be a preset value stored in the mobile communication terminal 100.

For example, if the threshold value is 0.1 m/s, the first speed is 0.1 m/s, and the second speed is 0.05 m/s, the guide band 42 rotates at a speed of 0.1 m/s when the user input has an average speed of 0.1 m/s or more, and rotates at a speed of 0.05 m/s when the user input has an average speed below 0.1 m/s.

Although this exemplary embodiment exemplifies a case where one threshold value is used, there is no limitation on the number of threshold values, and the rotation speed of the guide band according to each threshold value may also vary in other exemplary embodiments.

Figure 7:
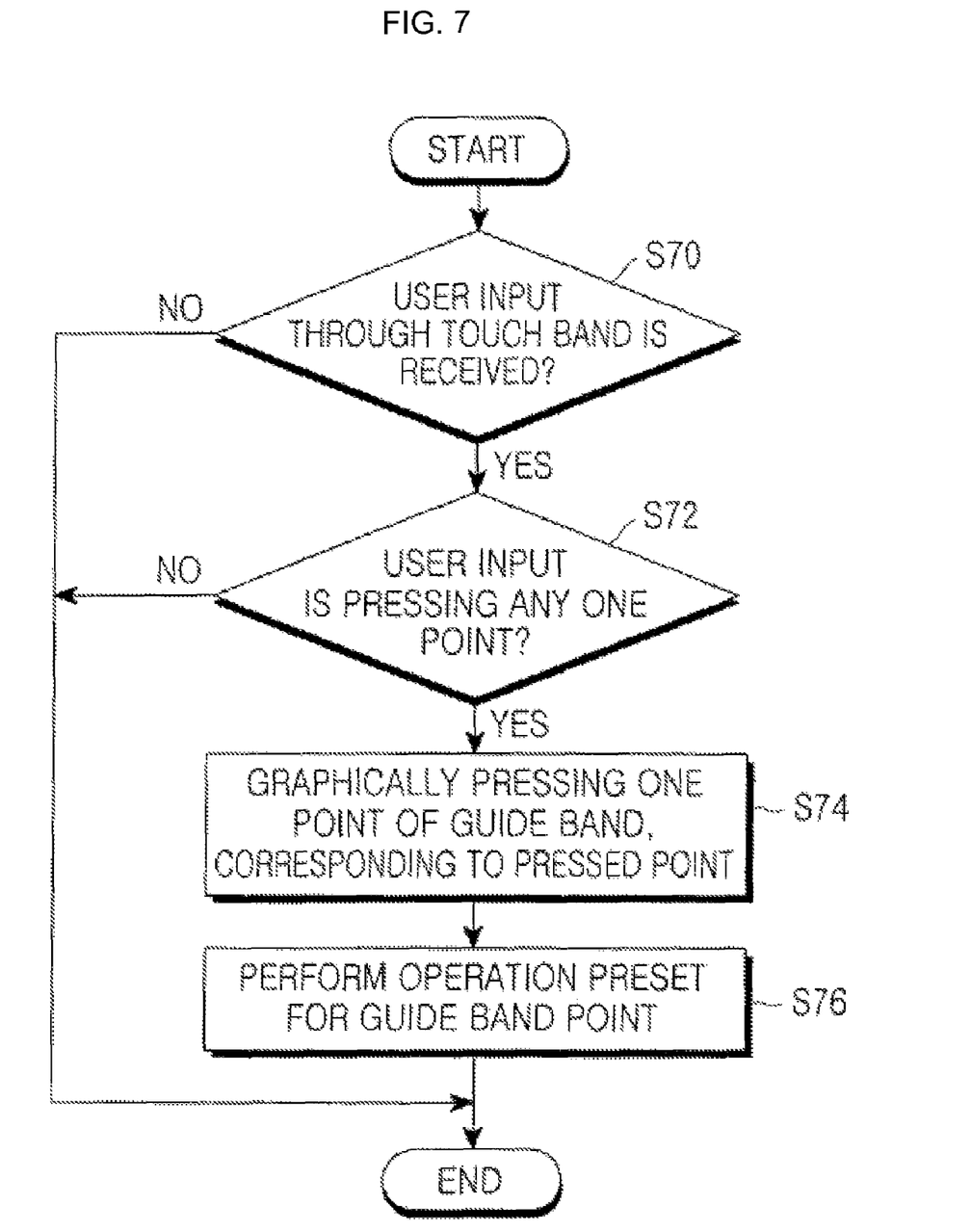
FIG. 7 is a flowchart showing a method of graphically providing a user interface that changes in real time corresponding to a user input received through a touch band according to yet another exemplary embodiment of the present invention.

FIG. 7 shows a method of providing a graphic user interface that changes in real time corresponding to a user input received through a touch band according to yet another exemplary embodiment of the present invention.

The controller 30 of the mobile communication terminal 100 determines if user input via the touch band 16 is received (S70). If a user input is not received (S70: NO), the mobile communication terminal 100 does not perform any other operation.

If user input is received (S70: YES), the controller 30 determines if the user input has been entered by pressing any one point on the touch band 16 (S72). When the user input is not effected by pressing any one point of the touch band 16 (S72: NO), the mobile communication terminal 100 does not perform any other operation.

When the user input is been entered by pressing any one point on the touch band 16 (S72: YES), the controller 30 controls the mobile communication terminal 100 to display the guide band 42 on the display 14 in such a manner that one point of the guide band 42, corresponding to the pressed point of the touch band 16, is pushed down (S74). The controller 30 performs a preset instruction for the pushed-down point of the guide band 42 (S76).

The preset instruction for the push-down point may be instructions for REW, PLAY, FF, or STOP when the mobile communication terminal is in the multimedia playback mode.

Figure 8:
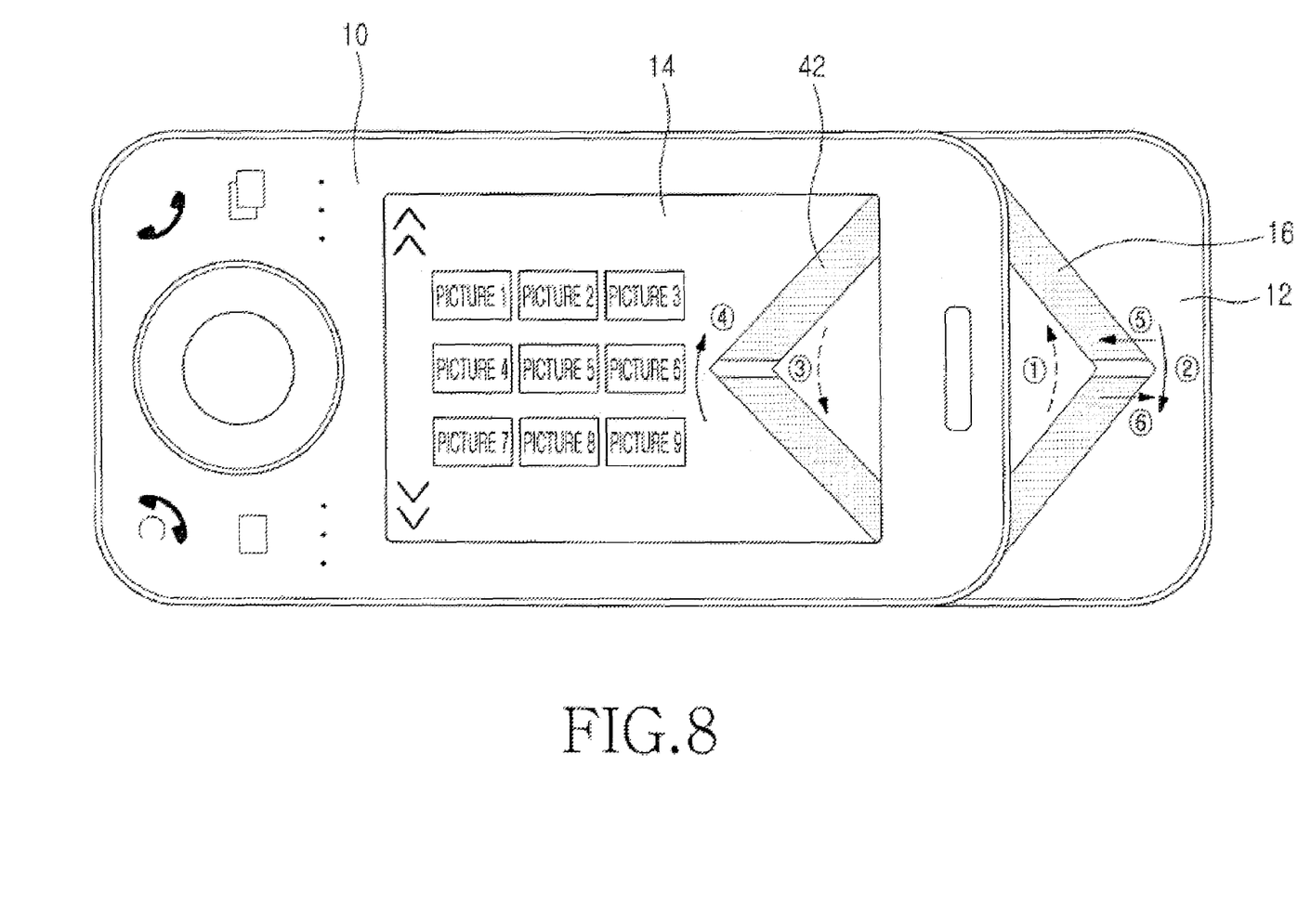
FIG. 8 is a view showing a user interface that changes in real time corresponding to a user input received through a touch band according to another exemplary embodiment of the present invention.

FIG. 8 shows a user interface that changes in real time corresponding to a user input received through a touch band according to another exemplary embodiment of the present invention.

The exemplary embodiment of FIG. 8 exemplifies a case where the touch band 16 and the guide band 42 changing in real time corresponding to user input received through the touch band 16 form a rhombus. Picture files previously stored in the mobile communication terminal 100 are arranged on the display 14.

A picture file is selected by receiving a user input supplied via the touch band 16. If a user enters input by continuously touching the touch band 16 with a wedge form of ">" in the clockwise or counterclockwise direction, the guide band with a wedge form of "<" correspondingly rotates clockwise or counterclockwise. Since the touch band 16 is fixed to the lower body 12, it does not actually move even when user input is received. However, the guide band 42 may be displayed on the display 14 while being altered from the shape of symbol "<" according to the angle of rotation.

For example, suppose "Picture 5" has been selected in FIG. 8, picture file selection shifts from "Picture 5" to "Picture 8" when a continuous input is made counterclockwise (1) from any one point to any other point of the touch band 16, and shifts from "Picture 5" to "Picture 2" when a continuous input is made clockwise (2) from any one point to any other point of the touch band 16.

Also, by continuously touching the touch band 16 from any one point to any other point in the longitudinal direction of the mobile communication terminal 100, the user can enter touch input that causes the guide band 42 to be pushed left (designated by arrow 5) or pulled right (designated by arrow 6). The mobile communication terminal 100 can receive such an input and newly select a picture file.

For example, suppose the current selected picture file is "Picture 5", "Picture 4" is newly selected by a user's touch input that causes the guide band 42 to be pushed left (5). In the same manner, picture file selection shifts from "Picture 5" to "Picture 6" by a user's touch input that causes the guide band 42 to be pulled right (6).

Figure 9:
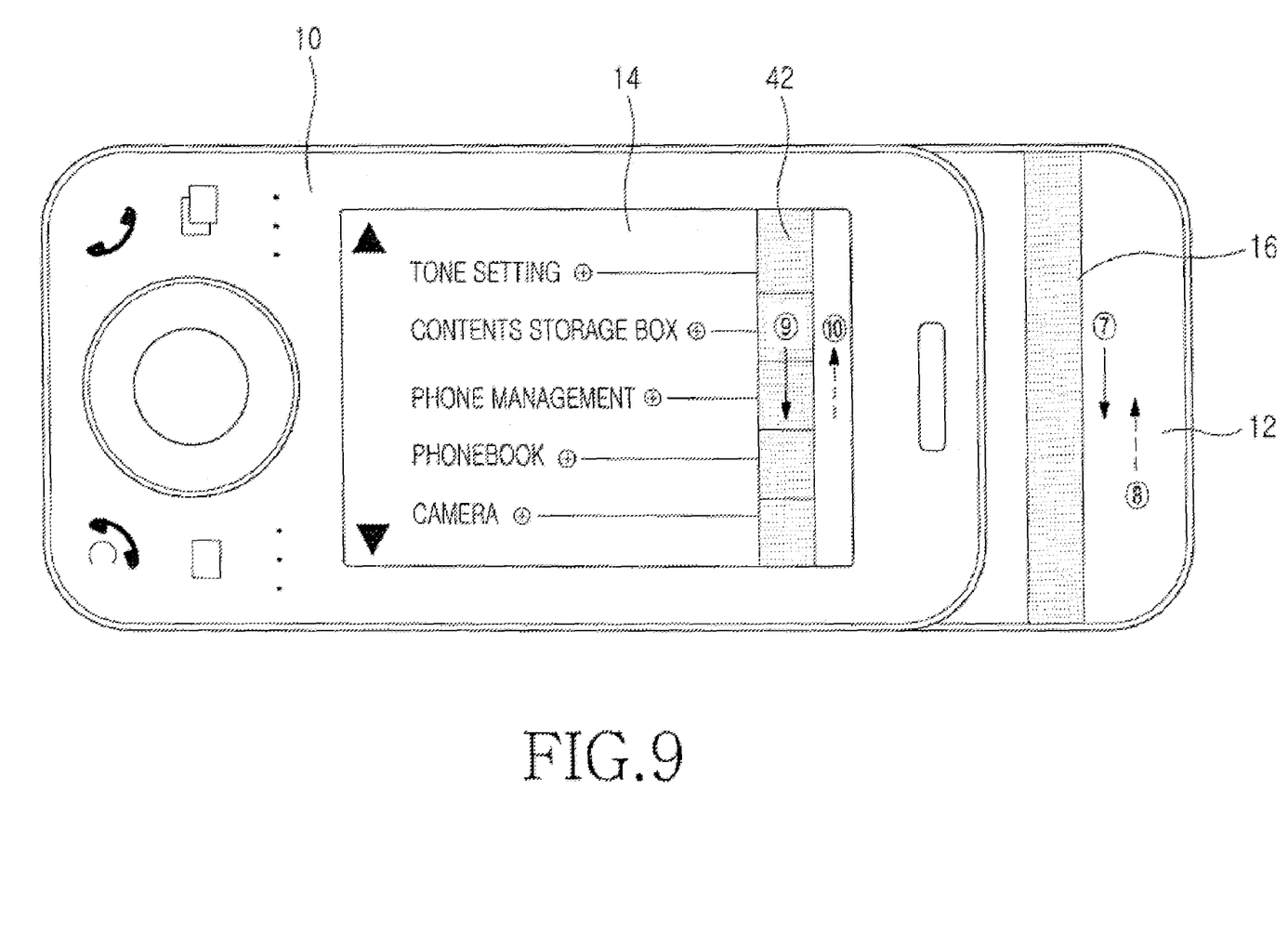
FIG. 9 is a view showing a user interface that changes in real time corresponding to a user input received through a touch band according to yet another exemplary embodiment of the present invention.

FIG. 9 shows a user interface that changes in real time corresponding to a user input received through a touch band according to yet another exemplary embodiment of the present invention.

The exemplary embodiment of FIG. 9 exemplifies a case where the touch band 16 and the guide band 42 changing in real time corresponding to user input received through the touch band 16 are in the form of a straight line. A menu including various menu items for the mobile communication terminal 100 is arranged on the display 14. A user can select a menu item by using the touch band 16. If the user makes an input by continuously touching the touch band 16 from any one point to any other point in the upward (designated by arrow 8) or downward (designated by arrow 7) direction, the guide band 42 is correspondingly pushed up or pulled down. With the up and down movement of the guide band 42, the menu or a selected menu item displayed on the display 14 is changed.

For example, a selected menu item may be displayed while protruding to the right side of the center of the mobile communication terminal 100, and one menu item from among the menu items may be selected by moving up or down. In FIG. 9, menu item "mobile phone management" has been selected. If the user enters touch input that causes the guide band 42 to be pushed up (8), the menu items displayed on the display 14 also move from bottom to top (designated by arrow 10). Thus, menu selection shifts to menu item "phonebook" or "camera". To the contrary, if a user's touch input causes the guide band 42 to be pulled down (7), the menu items displayed on the display 14 also move from top to bottom (designated by arrow 9), and thus menu selection shifts to menu item "tone setting" or "contents storage box".

Figure 10:
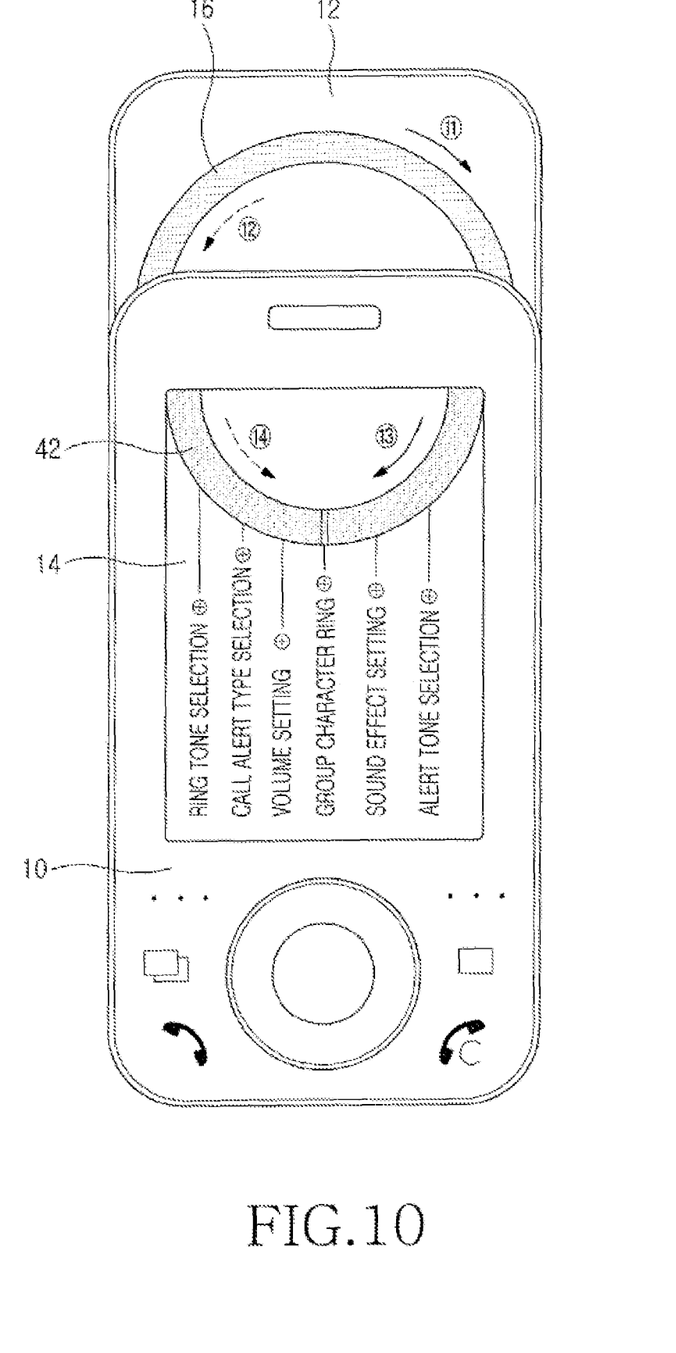
FIG. 10 is a view showing a user interface that changes in real time corresponding to a user input received through a touch band according to still yet another exemplary embodiment of the present invention.

FIG. 10 shows a user interface that changes in real time corresponding to a user input received through a touch band according to still yet another exemplary embodiment of the present invention.

The exemplary embodiment of FIG. 10 presents how the guide band 42 changes in real time corresponding to user input received through the touch band 16 after the upper body 10 slides in the case where the mobile communication terminal 100 has a longitudinal length larger than a transverse length.

The arcuate touch band 16 and the arch-shaped guide band 42 displayed in the upper portion of the display 14 appear to connect with each other, thereby forming a circle.

If a user makes a directional input by continuously touching the touch band 16 from any one point to any other point of the touch band 16, the mobile communication terminal 100 receives the user input and rotates the guide band 42 on the display 14. Here, the directional user input may be clockwise (designated by arrow 11) or counterclockwise (designated by arrow 12).

If clockwise user input (11) is entered using the touch band 16, the guide band 42 also rotates clockwise (designated by arrow 13). In a similar manner, if a counterclockwise user input (12) is entered using the touch band 16, the guide band 42 also rotates counterclockwise (designated by arrow 14).

As the guide band 42 rotates, menu items displayed on the lower side of the guide band 42 change. Referring to FIG. 10, among various menu items for the mobile communication terminal 100, submenu items related to tone setting are arranged on the display 14. If the user applies a counterclockwise user input (12) onto the touch band 16, the guide band 42 also rotates counterclockwise (14), and at the same time the submenu items on the display 14 are rearranged by moving from left to right.

If a submenu item located in the center of the display 14 is the currently selected menu item, the selected menu item may shift from "group character ring" to "volume setting", "call alert type selection", etc. according to operations of rotating the touch band 16 by the user.

As described above, exemplary embodiments of the present invention provide a bidirectional slide-type mobile communication terminal for providing a user interface that changes in real time according to user input, which may enable a user to recognize and easily operate the user interface, and a method of providing such a graphic user interface.

Although the exemplary embodiments of the present invention exemplify a graphic user interface in a multimedia playback mode or an environment setting mode, this is for the convenience of explanation merely, and those skilled in the art may apply the present invention to an interface for any operation mode other than the communication mode of a bidirectional slide-type mobile communication terminal. Therefore, it should be appreciated that the exemplary embodiments described above are not limitative, but only illustrative.

The exemplary embodiments of the present invention includes touch bands 16 of various different shapes. Each type of touch band 16 may be used for all of the various functions shown in the different exemplary embodiments.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of providing a graphic user interface in a bidirectional slide-type mobile communication terminal comprising a touch band equipped lower body and an upper body that slides with respect to the lower body, the method comprising:
   detecting a sliding movement of the upper body;
   switching the terminal to an operation mode according to a direction of the detected sliding movement;
   displaying a graphic user interface (GUI) according to the operation mode to which the terminal is switched;
   receiving input from the touch band; and
   changing the displayed GUI in real time corresponding to the received input,
   wherein the touch band is disposed on a surface of the lower body exposed by the sliding movement of the upper body,
   wherein the GUI comprises a guide band, the guide band comprising an image of the touch band,
   wherein changing the displayed GUI comprises graphically simulating a physical response to input on the touch band.

2. The method of claim 1, wherein the touch band comprises a sensor to sense a user input.

3. The method of claim 1, wherein the touch band has an arcuate shape, and the GUI comprises an arch-shaped guide band that substantially forms a circular band with the arcuate touch band when the upper body slides.

4. The method of claim 3, wherein the guide band graphically rotates or is graphically pressed corresponding to the received input.

5. The method of claim 4, further comprising:
   determining if the received input is continuously input from any one point of the touch band to the any other point of the touch band; and
   graphically changing the guide band in real time according to a moving direction from the any one point of the touch band to the any other point of the touch band.

6. The method of claim 5, wherein the guide band graphically rotates clockwise, when the moving direction of the received input is clockwise.

7. The method of claim 5, wherein the guide band graphically rotates counterclockwise when the moving direction of the received input is counterclockwise.

8. The method of claim 4, further comprising:
   determining if an average speed of the received input is equal to or greater than a threshold value when the received input is continuously input from any one point of the touch band to the any other point of the touch band; and
   graphically rotating the guide band at a rotational speed corresponding to the determined average speed of the received input.

9. The method of claim 4, further comprising:
   determining if the received input is input by pressing a point of the touch band;
   graphically pressing a point of the guide band corresponding to the point of the touch band; and
   performing an instruction corresponding to the graphically pressed point of the guide band.

10. The method of claim 1, wherein the touch band and the guide band displayed in the GUI each have a form of a straight strip, the touch band and the guide band in combination form a pair of parallel straight strips when the upper body slides, and the guide band graphically moves up and down or is graphically pressed according to the received input.

11. The method of claim 1, wherein the touch band and the guide band displayed in the GUI have a wedge form of "<" and a wedge form of ">" respectively, the touch band and the guide band in combination form a shape of "< >" when the upper body slides, and the guide band graphically rotates or is graphically pressed according to the received input.

12. A bidirectional slide-type mobile communication terminal comprising:
   a lower body and an upper body that slides with respect to the lower body;
   a touch band to receive an input, the touch band being located on the lower body and having an arcuate shape;
   a display to display a graphic user interface (GUI) comprising a guide band that substantially forms a circle with the touch band when the upper body slides; and
   a controller to control the display to graphically change the guide band in real time corresponding to the received input.

13. The terminal of claim 12, wherein the touch band comprises a sensor to sense the input.

14. The terminal of claim 12, further comprising a detector to detect a direction of a sliding movement of the upper body, wherein the controller switches the terminal to an operation mode corresponding to the detected direction of the sliding movement, and displays the GUI corresponding to the operation mode to which the terminal is switched.

15. The terminal of claim 12, wherein the sensor receives input that is continuously entered from any one point of the touch band to any other point of the touch band, and
   the controller determines a moving direction of the continuously entered input and graphically changes the guide band in real time corresponding to the moving direction.

16. The terminal of claim 15, wherein the controller graphically rotates the guide band clockwise when the moving direction is clockwise, and graphically rotates the guide band counterclockwise when the moving direction is counterclockwise.

17. The terminal of claim 12, wherein the touch band receives input entered by pressing any one point of the touch band, and
   the controller graphically presses a point of the guide band corresponding to the pressed point of the touch band, and performs a user instruction corresponding to the pressed point of the guide band.

18. The terminal of claim 12, further comprising a speaker to output voice data, wherein the speaker is located in the lower body and surrounds the arcuate sensor.

19. A bidirectional slide-type mobile communication terminal, comprising:
   a lower body and an upper body that slides with respect to the lower body;
   a sensor to receive an input, the sensor being located on the lower body;
   a display to display a graphic user interface (GUI) comprising a guide band; and
   a controller to control the display to graphically change the guide band in real time corresponding to the input received by the sensor,
   wherein the sensor and the guide band have the same shape,
   wherein the guide band comprises an image of the sensor,
   wherein the controller controls the display to graphically change the guide band by simulating a physical response to input on the sensor.

20. The terminal of claim 19, wherein the sensor and the guide band have either a semi-circular shape, a straight bar shape, or a chevron shape.

* * * * *